United States Patent [19]

Hall

[11] 3,875,385

[45] Apr. 1, 1975

[54] PROGRAMMED-SWEEP UNIT FOR EXPANDING THE CAPABILITIES OF A COMPUTER OF AVERAGE TRANSIENTS

[75] Inventor: Lawrence H. Hall, Woodland Hills, Calif.

[73] Assignee: The United States of America as represented by the United States Atomic Energy Commission, Washington, D.C.

[22] Filed: Mar. 8, 1974

[21] Appl. No.: 449,586

Related U.S. Application Data

[63] Continuation-in-part of Ser. No. 293,176, Sept. 28, 1972, abandoned.

[52] U.S. Cl.. 235/151.35, 235/92 CC, 235/150.51, 307/228, 307/265, 307/271, 328/58, 328/185

[51] Int. Cl. .......................... G06f 15/36, H03k 7/08

[58] Field of Search .......... 235/183, 92 CC, 151.35; 328/58, 59, 60, 181, 185; 307/228, 265, 271

[56] References Cited

UNITED STATES PATENTS

| | | | |
|---|---|---|---|
| 3,541,349 | 11/1970 | Bright et al. | 328/59 |
| 3,581,118 | 5/1971 | Van Zurk | 307/265 |
| 3,581,214 | 5/1971 | Seegmiller | 307/265 |
| 3,593,158 | 7/1971 | Day et al. | 307/265 |
| 3,670,209 | 6/1972 | Hensen | 307/265 |
| 3,699,460 | 10/1972 | Trasler | 307/228 |
| 3,701,954 | 10/1972 | Seminatore et al. | 328/59 |
| 3,739,374 | 6/1973 | Kiowski | 307/271 |
| 3,745,380 | 7/1973 | Kitajima et al. | 328/59 |
| 3,805,167 | 4/1974 | Nash et al. | 307/265 |

OTHER PUBLICATIONS

CAT-1000 Computer of average transients, Technical Measurement Corporation - Specification Data.

*Primary Examiner*—Felix D. Gruber
*Attorney, Agent, or Firm*—John A. Horan; Dean E. Carlson; Robert J. Marchick

[57] ABSTRACT

The present invention relates to an improved system for digitizing analog electronic signals. The programmed-sweep unit of the present invention is used in conjunction with a computer of average transients (CAT) and serves to vary the CAT's dwell time during a sweep so as to optimize placement of sampling points, thereby improving the CAT's capability of digitizing rapidly varying signals.

1 Claim, 13 Drawing Figures

BCD DECODING SCHEME

| NUMBER | COUNTER STATE (ABCD) | DECODER CONNECTIONS |
|---|---|---|
| 0 | 0 0 0 0 | A B C D |
| 1 | 1 0 0 0 | $\bar{A}$ B C D |
| 2 | 0 1 0 0 | A $\bar{B}$ C D |
| 3 | 1 1 0 0 | $\bar{A}$ $\bar{B}$ C |
| 4 | 0 0 1 0 | A B $\bar{C}$ |
| 5 | 1 0 1 0 | $\bar{A}$ B $\bar{C}$ |
| 6 | 0 1 1 0 | A $\bar{B}$ $\bar{C}$ |
| 7 | 1 1 1 0 | $\bar{A}$ $\bar{B}$ $\bar{C}$ |
| 8 | 0 0 0 1 | A $\bar{D}$ |
| 9 | 1 0 0 1 | $\bar{A}$ $\bar{D}$ |

BCD DECODING SWITCH

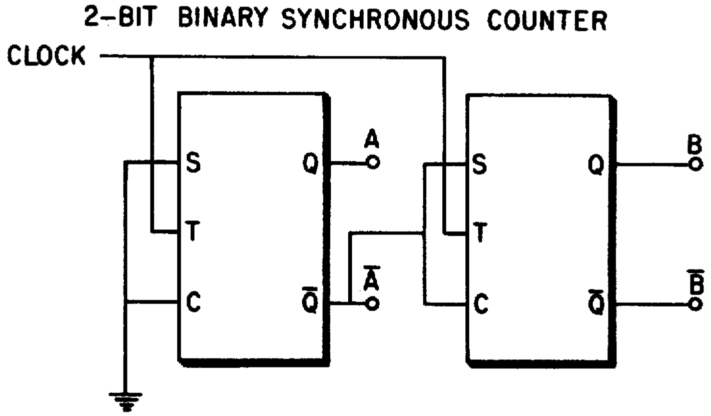
Fig. 10
BINARY DECODING SCHEME
| NUMBER | COUNTER STATE (AB) | | DECODER CONNECTIONS | |
|---|---|---|---|---|
| 0 | 0 | 0 | A | B |
| 1 | 1 | 0 | $\overline{A}$ | B |
| 2 | 0 | 1 | A | $\overline{B}$ |
| 3 | 1 | 1 | $\overline{A}$ | $\overline{B}$ |
Fig. 11
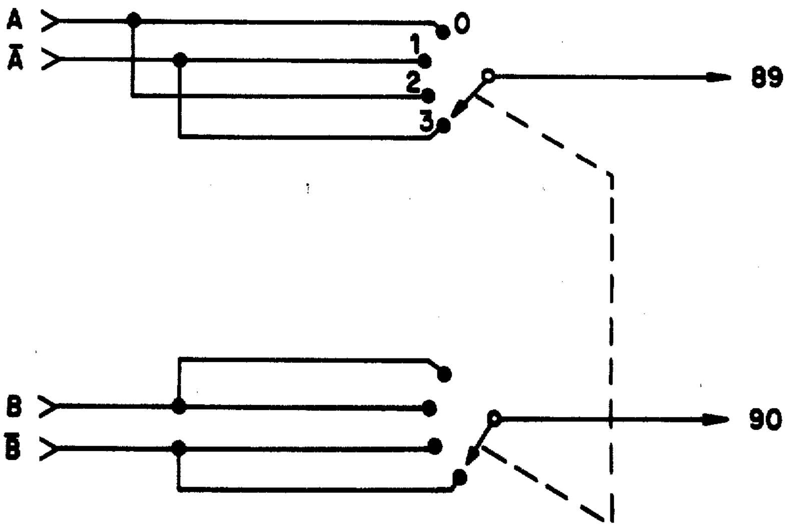
Fig. 12

PROGRAMMED-SWEEP UNIT FOR EXPANDING THE CAPABILITIES OF A COMPUTER OF AVERAGE TRANSIENTS

This application is a Continuation-in-Part of application Ser. No. 293,176, filed Sept. 28, 1972, now abandoned.

BACKGROUND OF THE INVENTION

A computer of average transients (CAT) is a signal processing computer often used to extract repetitive signals from noise or more simply to digitize a slowly varying signal. It operates by analyzing the magnitude of an input voltage during each time period, converting the input voltage to a digital representation, and then storing this in core memory. The computer of average transients performs averaging of noise during each time period, unlike other methods which essentially sum noise. It is capable of considerable accuracy and convenience in the production of data. However, a computer of average transients is generally limited to a single dwell time, constant sampling intervals, and equal spacing of data points during each sweep. Equal spacing of the data points may severely limit the effective precision of the digitization for certain waveforms, particularly if each waveform is of a widely varying amplitude and decay constant. An example of signals with widely varying amplitude and decay constants are transient optical decay signals of the type encountered in radiative decay of organic molecules. In the triplet state of organic molecules, each sublevel has its own radiative decay component. If the spin-lattice relaxation between these levels is comparable to or less than these radiative rate constants, the optical decay of the triplet state appears as the sum of three exponentials:

$$I = \sum_{i=1}^{3} A_i \exp(-B_i t)$$

where I is the intensity observed by a photomultiplier tube. If the $A_i$ and $B_i$ are known along with certain other molecular parameters, the spin-lattice relaxation rate constants can be extracted. Typically, the components of the decay might have rate constants of 6, 200, and 600 msec with initial intensities of 5 V, 100, and 200 mV, respectively. As these rate constants give insight into lattice dynamics, it is desirable to obtain the optical decay in the form of the above equation.

For this purpose, the output of the photomultiplier tube must be recorded with considerable accuracy over several orders of magnitude, e.g., from 5V to 1mV. Previously, the signal had been photographed on the screen of an oscilloscope. As many as six photographs were necessary to record the entire decay. For successive exposures, the oscilloscope gain was increased and the sweep rate decreased. Saturation of the oscilloscope's input amplifier was avoided by a solenoid-actuated shutter in front of the photomultiplier tube. The shutter blocked the signal up to the time of observation. This technique allows determination of the $A_i$ and $B_i$ of the above equation with an experimental accuracy of not better than 10 percent and perhaps as much as 50 percent. Ten minutes was necessary to record each decay and then several hours of computation was necessary to process the data.

An alternative is to feed the output of the photomultiplier tube to a logarithmic amplifier and record its output on the face of an oscilloscope. However, the accuracy of this method would have been limited to 5 or 10 percent by the process of extracting three lifetimes from the decay curve on a single photograph. Commercially available logarithmic amplifiers have linearities of about ± 2 percent full scale. Such an amplifier must have a band width large enough to respond without distortion to the fastest decay component, and it must also be stable to changes in temperature and supply voltage.

Another method is determination of $A_i$ and $B_i$ by comparison of the decay with an electronically-generated simulation signal. The simulated decay would be the sum of three exponentials whose parameters could be adjusted to obtain the best visual fit with the observed decay. These parameters would then be read off the front of the instrument. This procedure has the advantage that it yields values at the time of the experiment, and for single exponentials it is quite adequate. However, for more complex waveforms there are significant errors in the generation of the simulated decay and its comparison with the experimental decay.

SUMMARY OF THE INVENTION

Accordingly, it is an object of the present invention to improve the capabilities of a computer of average transients to digitize analog electronic signals. The invention is called a programmed-sweep unit and its function is to change the computer's dwell time (the time allotted for each channel) during the computer's sweep so as to optimize sampling and averaging intervals. Without the programmed-sweep unit, the dwell time must be preset to one of a limited number of values, and the number and kind of waveforms that can be digitized is thus limited. For example, a computer of average transients alone is unable to accurately digitize a signal that varies rapidly for a short period of time and then slowly for a longer period. However, with the programmed-sweep unit of the present invention, such signals can be accurately digitized.

BRIEF DESCRIPTION OF THE DRAWINGS

FIG. 10 is a schematic diagram of a 2-bit binary synchronous counter.

FIG. 11 is a table of a binary decoding scheme.

FIG. 12 is a schematic diagram of a binary decoding switch.

DESCRIPTION OF THE PREFERRED EMBODIMENT

Figure 1:
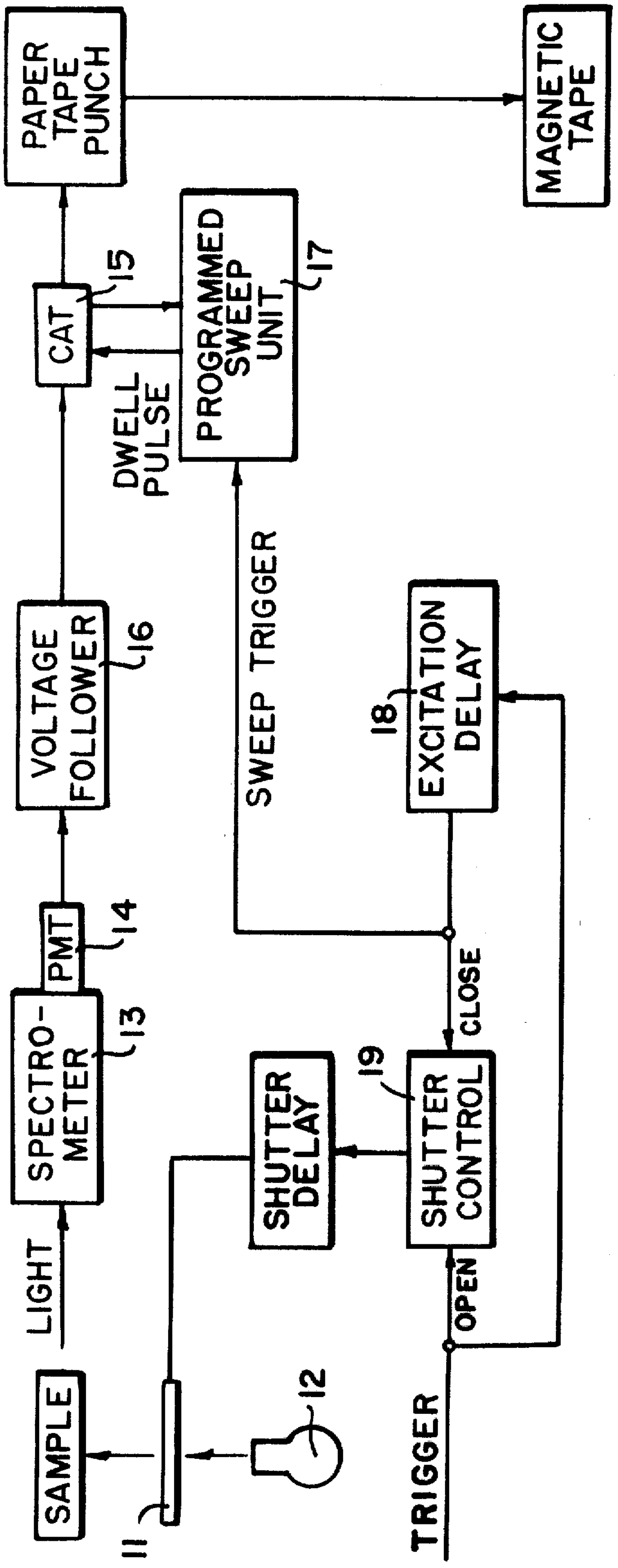
FIG. 1 is a block diagram of the CAT system including the programmed-sweep unit of the present invention.

A block diagram of a system using the computer of average transients (CAT), including the programmed-sweep unit of the present invention, is shown in FIG. 1. The system shown indicates instrumentation for accurately digitizing transient optical decay signals. A manual trigger causes the electronic shutter 11 to open for a time on the order of 10 seconds. During this time a sample is excited with ultraviolet light from light source 12. The resultant optical decay signal passes first through a spectrometer 13, and then through a photomultiplier tube 14. When the shutter closes at the end of the delay period, the sweep of the computer of average transients (CAT) 15 is initiated, and the CAT digitizes the signal from the photomultiplier tube. The programmed-sweep unit 17 serves to automatically vary the sweep time so as to optimize sampling intervals. The output impedance of the photomultiplier tube is matched to the lower input impedance of the CAT by an amplifier 16 operated in a voltage-follower configuration.

The programmed-sweep unit 17 is reset manually if necessary and the shutter is cocked. Then the system is triggered. During the excitation period of about 10 seconds, the memory of the CAT is cleared and it is placed in a negative-accumulate mode. The shutter closes and initiates the sweep. After this sweep, the CAT is placed in a positive-accumulate mode and the sweep is triggered again, with the shutter remaining closed.

The excitation delay 18 is a standard unijunction-transistor circuit capable of time delays up to 3 minutes. The delay period is initiated by application of power to the delay. At the end of the delay period the CAT is triggered through the programmed-sweep unit.

The shutter mechanism consists of the mechanical shutter itself and an integral transistorized shutter-control circuit 19. The shutter has an aperture normally covered by two blades. When the shutter is cocked and triggered on blade is released, uncovering an aperture in the second blade, the aperture being held open by a miniature electromagnet. The electromagnet is energized by the electronic circuit. The first blade when released closes a switch, causing a capacitor to begin charging through a variable resistor. When the voltage across the capacitor reaches a certain level, the circuit de-energizes the electromagnet, the second blade is released, and the shutter closes.

The transistorized shutter control circuitry is powered by a single 1.5 volt cell. The light-sensitive resistor is replaced by a multi-decade resistance box. The switch that initiates charging of the capacitor is replaced by a silicon NPN transistor. The shutter is cocked manually and opened by a solenoid operated remotely. The shutter then remains open. When the transistor is driven into a conducting state by the programmed-sweep unit, the shutter closes after a delay of several milleseconds as determined by the resistance replacing the light-sensitive resistor.

The voltage-follower circuit 16 matches the 1 megohm photomultiplier tube impedance to the 100 kilohm impedance of the CAT modulator. Since the photomultiplier tube is a current device, matching is necessary to maintain the input voltage. The voltage-follower circuit is advantageous, as the circuit performance does not depend critically on the gain of the integrated circuit operational amplifier. The voltage-follower circuit also provides the voltage offset necessary for operation with the photomultiplier tube.

Input voltage to the CAT, for reasons of versatility, is a modified 400 channel pulse height analyzer. The instrument is operated in the multiscale mode with input from a CAT modulator board with a 1-MHz center frequency. The pulse rate may be varied from 0.5 to 1.5 MHz by adjusting the input voltage between −3 and +3 volts.

The input voltage to the CAT serves to vary the pulse rate of a free-running modulator in the CAT. The number of modulator pulses between each pair of dwell pulses is counted by the CAT and placed in core memory. The programmed-sweep unit of the present invention serves to vary the CAT's dwell time so as to optimize sampling intervals. The CAT generates dwell pulses of particular amplitude, pulse rate, and pulse duration. The channel advance of the CAT is normally advanced by these dwell pulses. The programmed-sweep unit allows only certain dwell pulses to pass from the pulse generator in the CAT to the channel-advance circuitry. Essentially, it passes every I th pulse for a total of L and then every J th pulse for a total of M, and then every K th pulse for a total of N. The values of I, J, K, and L, M, N are integers variable over large ranges subject to the constraint that the sum L+M+N must be equal to or less than the number of available channels. In effect, one has L dwell periods of duration I msec, M dwell periods of J msec duration, and N dwell periods of K msec duration. The choice of three dwell periods during a single sweep allows a wide variety of input signals to be accurately digitized. The circuit could be expanded without much difficulty to offer the choice of any number of sequences.

In an unmodified CAT the channel address counter is advanced in the multiscaling mode by a pulse generated in the dwell time circuitry of the CAT. One dwell pulse advances the channel number by one. For use with the programmed-sweep unit (PSU) the CAT is modified so that instead of having the dwell pulse go directly to the channel address counter, it instead goes to the PSU and is then returned to the CAT's channel address counter. The function of the PSU is to allow only certain dwell pulses to pass so as to optimize data collection by the CAT.

For use of a CAT with the PSU, the CAT's dwell pulse is made available on an external panel-mounted connector. The input to the CAT's channel address counter is likewise made available on an external connector, and the usual connection between the CAT's dwell time circuitry and the input to the channel address counter is disconnected. These modifications are simple to make, but are not available at this time on any commercially available CAT. For normal operation the two connectors mentioned above are connected. For operation with the PSU the CAT's dwell pulse output is connected to the PSU input and the PSU output is connected to the CAT's channel address advance input.

Figure 2:
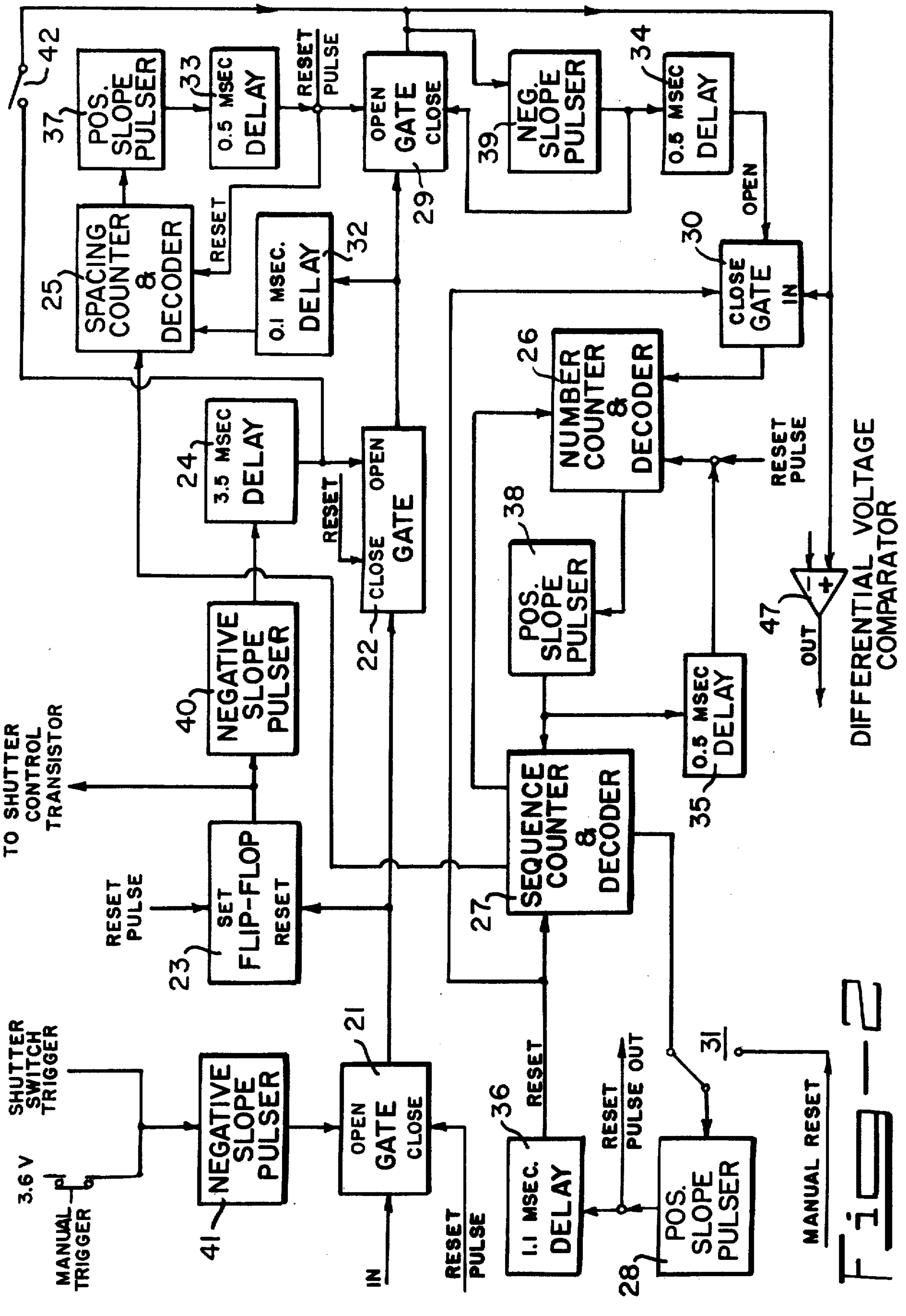
FIG. 2 is a block diagram of the programmed-sweep unit.

Referring to FIG. 2, gates 21 and 22 and their associated circuitry are part of the triggering and shutter control circuitry. Gate 21 is closed until the negative-going input from either the manual trigger or the excitation delay opens it. The next CAT-generated dwell pulse starts the shutter sequence by triggering a flip-flop 23. The output of the flip-flop goes negative, pulling the shutter-trigger transistor into conduction and starting the trigger delay period. Delay 24 provides a convenient time offset and then opens gate 22. The shutter delay is adjusted so that the closing of the shutter is synchronized with the first pulse through gate 22. If switch 42 is closed, the output of delay 24 is the first pulse to reach the CAT, and it starts the CAT's read-write cycle and its sweep. Because of uncertainties in the time necessary to start the read-write cycle, the first channel is discarded. If this feature is not desired, switch 42 is opened.

The spacing counter 25 with gate 29 controls the spacing of output pulses. The number counter 26 determines the number of output pulses with a given spacing. The sequence counter 27 and its associated circuits, including a bank of rotary switches, control both the spacing and number counters and decide the spacing and number of output pulses for each sequence. The number counter increments the sequence counter when the end of a sequence is reached.

Gate 29 is initially open and Gate 30 is initially closed. The first pulse to pass Gate 22 doesn't reach the number counter, but it opens Gate 30, and closes Gate 29 after passing through it. Gate 29 is opened repeatedly by the spacing counter at the appropriate time.

The counters 25, 26, 27 are used to count the 1-msec dwell pulses from the CAT. The spacing counter 25 is two decade counters in succession, and therefore can count from 0 to 99. Two rotary switches for each of the three sequences connect the decoders to the spacing counter. The decoder circuitry indicates when the counter to which it is connected reaches a number preset by use of the rotary switches. When the set number for a sequence is reached, the counters automatically reset and gate 29 is opened, allowing only the next pulse to pass. The falling edge of the passed pulse closes gate 29. Thus the rotary switches for each sequence choose the dwell time for that sequence.

The number counter 26 counts from 0 to 399. The last two digits are provided by cascading decade counters. The most significant digit is provided by a 2-bit synchronous binary counter. The number counter determines the number of pulses in each sequence.

The sequence counter 27 is a 2-bit binary synchronous counter. Each output from the number counter indicates the end of a sequence, and the sequence counter changes state, causing the number and spacing counters to decode new numbers. Both the number and spacing counters each have three sets of decoders—one for each sequence. Each decoder indicates with a high output when the counter it decodes has reached a preset number. The number each set decodes is determined by the rotary switches. The decoder switching circuit (FIG. 3) lets the sequence counter 27 control which decoder set is operative. The inputs 1, $\bar{1}$, 2, $\bar{2}$ are from the sequence counter, and as they change, successive decoder sets are connected. The 0 state of the sequence counter corresponds to the first sequence.

At the end of the third sequence, the positive slope pulser 28 decodes the number three indicating that the CAT sweep is over. It then resets all counters and sets the flip-flop and all gates in their initial states. Switch 31 does the same thing manually if necessary.

The counters in the programmed-sweep unit are composed of cascaded synchronous counter stages. For instance, the number counter 26, which counts from 0 to 399, is composed of two decade counter stages and one two-flip-flop binary counter stage, which counts from 0 to 3 and provides the most significant digit for the number counter. The clock input of each counter stage receives a clock pulse only when the previous counter stage is in the "nine" state with the exception of the first counter stage, which receives all clock pulses. The circuitry for doing this is relatively simple and is shown for a decade counter in FIG. 7. Each decade counter consist of four flip-flops connected with a number of gates and inverters. With successive clock pulses each flip-flop changes state. For each flip-flop there are two outputs, for instance A and its complement $\bar{A}$. For decoding a given number the inputs of an OR-gate are connected to the flip-flop outputs as shown in the BCD table in FIG. 8. Each set of decoder connections corresponds uniquely to a number. Only when the counter stage reaches this number do all the inputs of the NOR-gate go low and the output of the gate go high.

For each decade counter stage there is a 10-position 4-pole rotary switch, which is wired so as to connect the four NOR-gate inputs. The first pole of the rotary switch, for instance, connects the first input of the NOR-gate to either the A or $\bar{A}$ input.

The outputs of the decoding NOR-gates for each counter stage are inverted and feed into the inputs of another NOR-gate. The output of this output NOR-gate goes high only when all the flip-flops of the counter have reached their designated states. For instance, for the number counter there are a total of 10 flip-flops to count from 0 to 399. The high output from the output NOR-gate indicates when the set number of dwell pulses have entered the counter.

Figure 3:
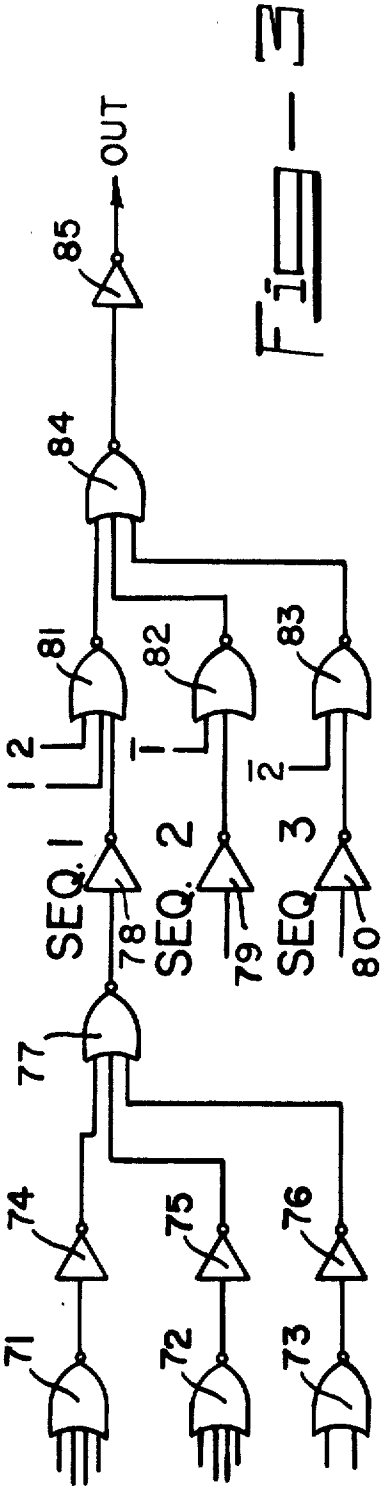
FIG. 3 is a schematic diagram of decoder circuitry.

The above description is for each set of decoders and decoding switches. In the PSU a total of three sets are connected so that the number counter and also the spacing counter decode one number for each sequence. The number counter decodes one number once for the first sequence, then another number, and finally a third number for the last sequence. In the case of the number counter a total of nine rotary switches are used. The circuitry for connecting the decoders is shown in FIG. 3. The inputs 1, $\bar{1}$, 2, $\bar{2}$ are from the sequence counter (a two flip-flop counter). As the sequence counter assumes states 0, 1, 2, different sets of decoders and decoding switches are successively enabled. Thus the output of the circuitry in FIG. 3 goes high each time the number counter has counted the set number of dwell pulses as determined by one set of decoder switches.

The logic is designed using the Motorola plastic MRTL dual in-line integrated circuits. Other logic families could be used but the switching characteristics and noise immunity of the MRTL family are quite adequate.

Referring to FIG. 3, the inputs to NOR-gates 71 and 72 are each connected to the outputs (A, $\bar{A}$, etc.) of a decade counter, and the inputs of NOR-gate 73 are connected to the outputs of a 2-bit binary counter. The outputs of NOR-gates 71, 72, 73 are inverted by inverters 74, 75, 76 whose output is fed into NOR-gate 77.

This output is high only when the number from 0 to 399 set by the three rotary switches coincides with the state of the number counter.

Thus a total of nine rotary switches are associated with the number counter. The spacing counter is composed of two decade counters and thus needs only two rotary switches for each sequence for a total of six.

Figures 7, 8:
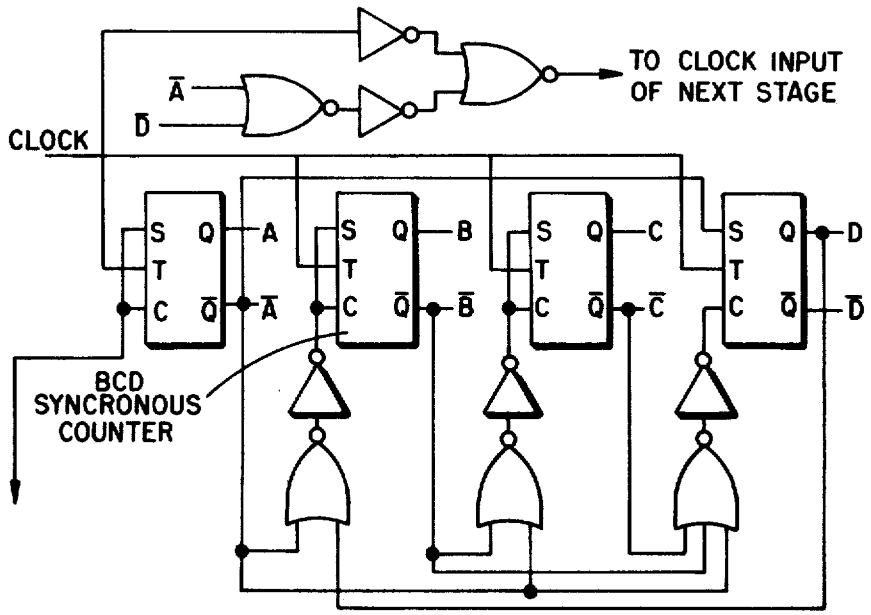
FIG. 7 is a schematic diagram of a typical decade counter.
FIG. 8 is a table of a binary-coded-decimal decoding scheme.

Below the decade counter (FIG. 7) is a table of gate connections to decode each digit (FIG. 8). When the counter is in the $n^{th}$-state the $n^{th}$-gate's would be high. A gate decoding 9 is used as a carry gate. Its inverse is applied to the input of a 2-input NOR-gate. When the decade counter is in the 9-state, the 10 or 0th trigger pulse is passed, inverted, and then applied to the trigger inputs of the next decade counter. Any number of decades can be cascaded.

Gate 30 of FIG. 2 is necessary as it must have $n+1$ pulses to define the dwell periods. Gate 29 is initially opened and gate 30 is initially closed. The first pulse to pass gate 22 does not reach the number counter but it opens gate 30 and closes gate 29 after passing through it. Gate 29 is opened repeatedly by the spacing counter at the appropriate time.

Delays 32, 33, 34, 35, and 36 are needed as the pulse generated by the counter changing state cannot be used to reset the counter. The logic is so fast that the reset pulse would be applied to the counter before the trigger pulse had ended.

Figure 4:
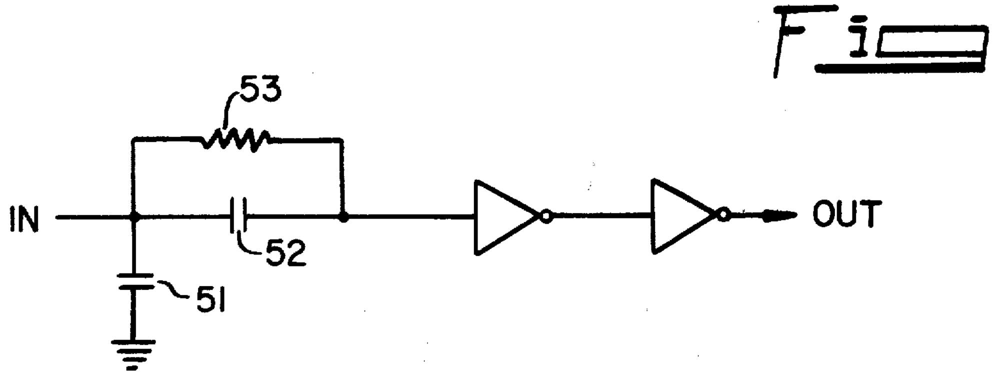
FIG. 4 is a schematic diagram of positive slope pulser circuitry.

The positive-slope pulsers 28, 37, and 38 produce a pulse when the input goes positive. FIG. 4 represents typical positive-slope pulser circuitry. Capacitor 51 prevents triggering on noise. The duration of the output pulse is determined by capacitor 52. Resistor 53 discharges capacitor 51 when the input returns to zero.

Figure 5:
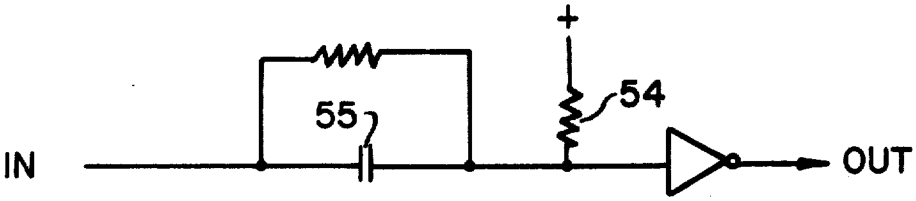
FIG. 5 is a schematic diagram of negative slope pulser circuitry.

The negative-slope pulsers 39, 40, and 41 produce a positive pulse when the input goes negative. FIG. 5 represents typical negative slope pulser circuitry. Resistor 54 biases the buffer amplifier on and with falling input the voltage across capacitor 55 drives the transistor out of condition for several microseconds. The length of the output pulse is determined by capacitor 55 and resistor 54.

Figure 6:
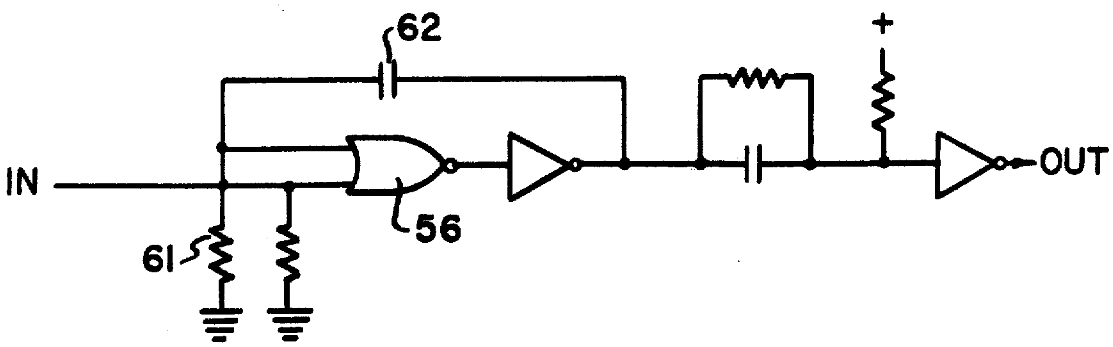
FIG. 6 is a schematic diagram of pulse delay circuitry.

The pulse-delay circuitry is presented in FIG. 6. It consists of a monostable-multivibrator followed by a negative-slope pulser. Initially, both inputs to the NOR-gate 56 are low. When a pulse drives the input positive, the output of the first buffer goes positive. The other input of the NOR-gate is then pulled positive, holding the gate's output at zero for a time approximately equal to the product of resistor 61 and capacitor 62, which for this circuit is on the order of milliseconds. Then, as the output of the first buffer goes negative, the negative-slope pulser produces a delayed output pulse.

The output of gate 29 is applied to a differential-voltage comparator 47. This integrated circuit has a rise time of about 5 nanoseconds and shapes the dwell pulses. A reference voltage of about 1 V is provided to yield a measure of noise immunity. Then the dwell pulse is returned directly to the channel-advance circuitry of the CAT.

The circuitry given in this specification is only one way of implementing the logic of the programmed-sweep unit. One modification that might be profitably made is the substitution of one of the recently available single-package monolithic decade counters for the discrete flip-flop synchronous decade counters used. The advantages would be elimination of the wiring of the synchronous counters and the simplification of the wiring of the decoder switches.

Figure 9:
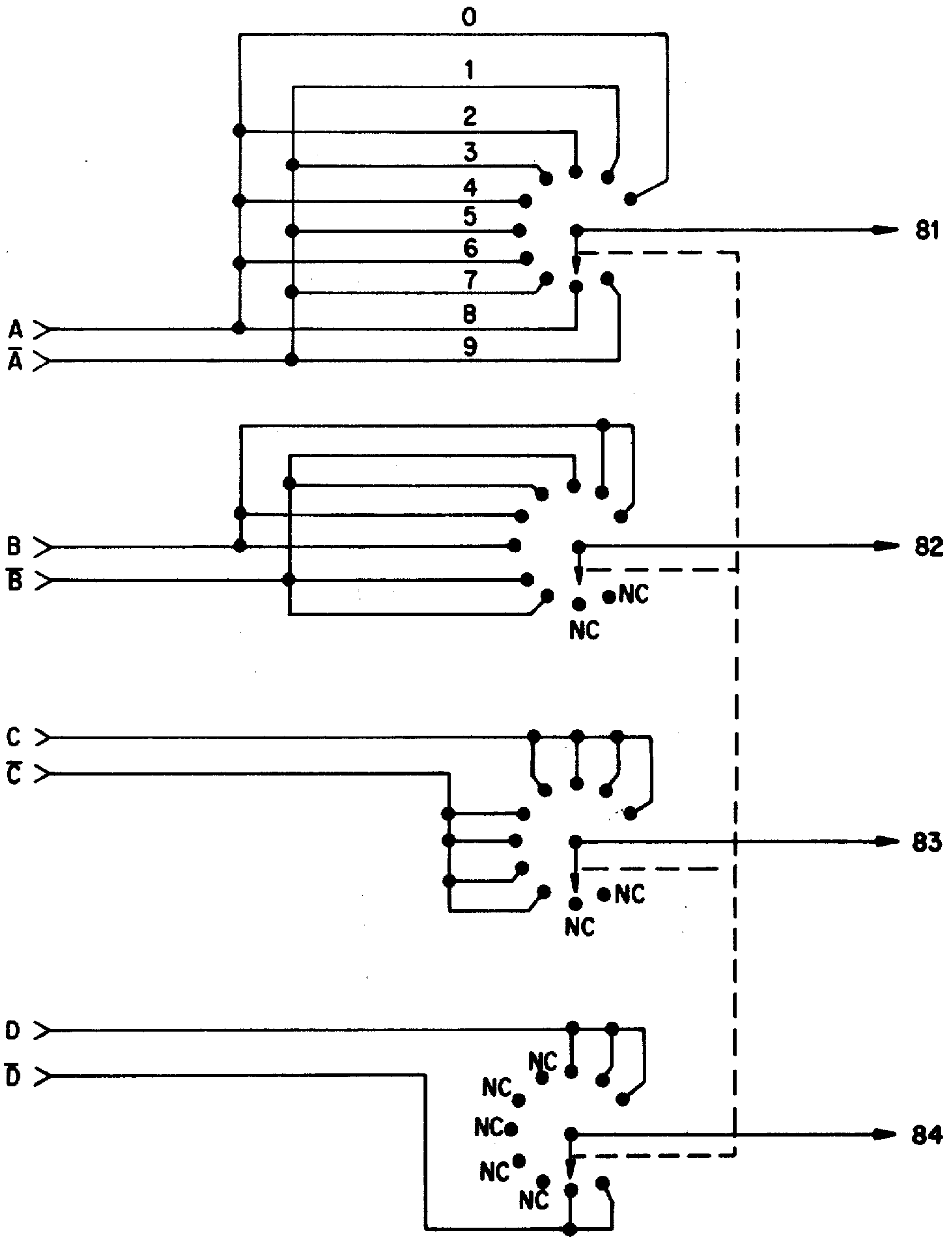
FIG. 9 is a schematic diagram of a binary-coded-decimal decoding switch.

In FIG. 9 is shown the wiring connections for the BCD decoding switch. Inputs A, A, etc. are from a decade counter (FIG. 7) and outputs 81, 82, 83, 84 go to the inputs of a NOR-gate (71 or 72) of the decoder circuitry (FIG. 3). Each switch is a 4-pole 10-position switch that implements the decoding scheme shown in FIG. 8.

In FIG. 10 is shown a 2-bit binary counter and in FIG. 11 is shown the decoding scheme for this binary counter. In FIG. 12 is shown the wiring connections for a 2-pole 4-position switch to implement this decoding scheme. The outputs 89 and 90 of this switch are directly connected to NOR-gate 73 (FIG. 3) for sequence 1.

Figure 13:
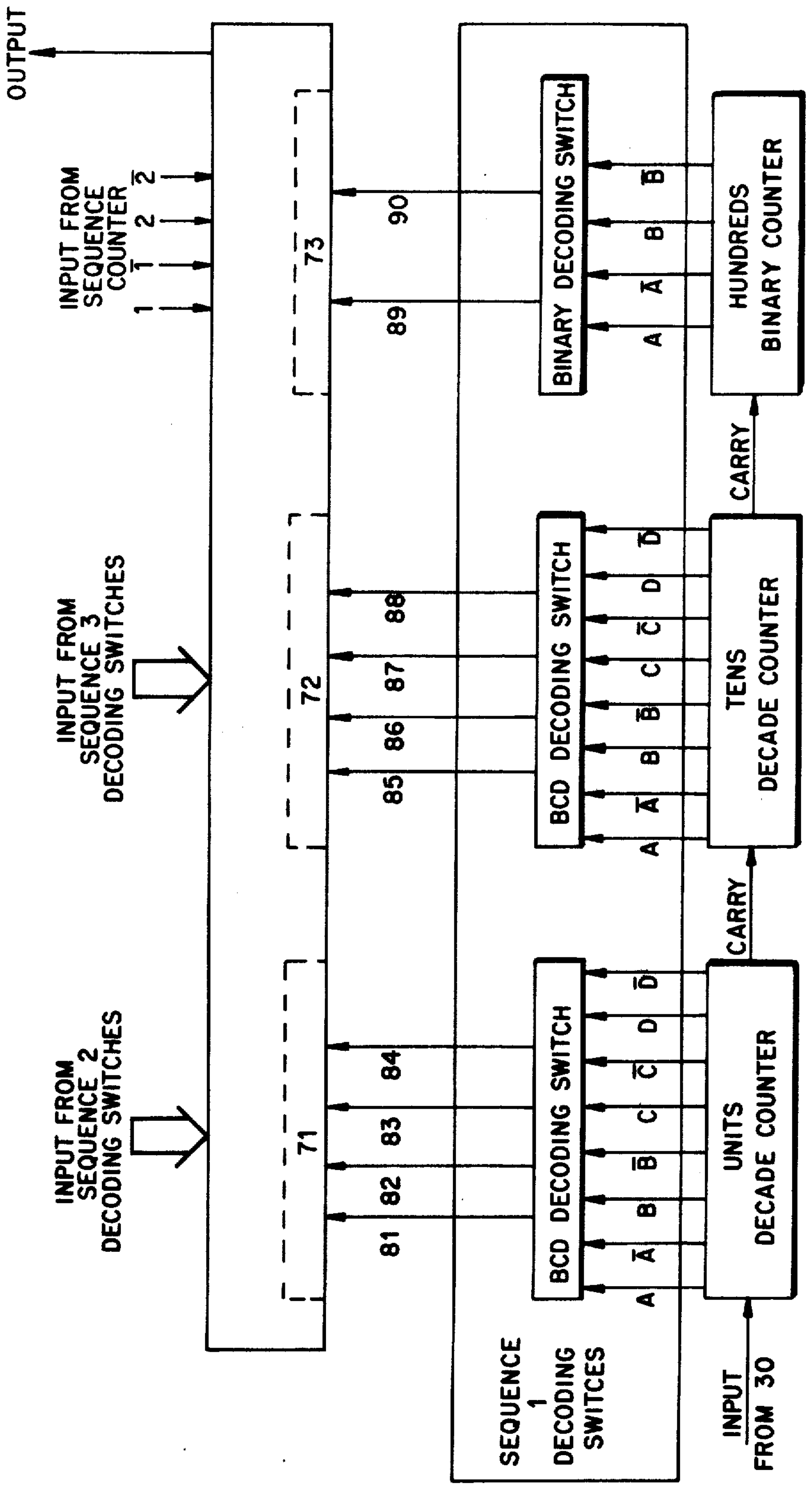
FIG. 13 is a block diagram of the number counter, decoding switches, and decoder circuitry.

In FIG. 13 is shown the interrelationship of the number counter, decoding switches, and decoding circuitry. The connections for the three decoder switches that are enabled during sequence 1 are shown in detail. Decoder switches for sequence 2 and for sequence 3 connect in the same way to the number counter, but their outputs are connected to the inputs of a set of inverters and NOR-gates corresponding to NOR-gates 71, 72, 73, and 77 and to inverters 74, 75, and 76 of FIG. 3. These logic elements input to inverters 78, 79, or 80 for sequences 1, 2, or 3 respectively.

What is claimed is:

1. A programmed-sweep unit for automatically varying the dwell time of a computer of average transients during sweep comprising:

a first gating means opened by an external trigger;

a flip-flop means electrically connected to the output of said first gating means;

a first negative slope pulser electrically connected to said flip-flop means for producing an output pulse in response to a negative going pulse from said flip-flop means;

a first delay means electrically connected to said first negative slope pulser to delay the output pulse of said first negative slope pulser by a preset time period;

second gating means opened by a pulse from said first delay means and electrically connected to the output of said first gating means;

second delay means electrically connected to the output of said second gating means;

a spacing counter electrically connected to the output of said second delay means;

a first decoder means electrically connected to said spacing counter for providing an output pulse only when the state of said spacing counter coincides with a preset value corresponding to a desired pulse-rate-interval;

a first positive slope pulser electrically connected to the output of said first decoder means for providing an output pulse in response to a positive going output from said first decoder means;

a third delay means electrically connected to the output of said first positive pulser to provide an output pulse delayed by a preset time period;

third gating means electrically connected to said third delay means so as to open said third gating means upon an input pulse from said third delay means, and further connected to the output of said second gating means;

a second negative slope pulser electrically connected to the output of said third gating means for providing an output pulse in response to a negative going pulse from said third gating means;

a fourth delay means electrically connected to said second negative slope pulser for providing an output at a preset time delay period;

a fourth gating means electrically connected to the output of said third delay and further connected to the output of said second gating means;

a number counter electrically connected to the output of said fourth gating means;

a second decoder means electrically connected to said number counter for providing an output pulse only when the state of said number counter coincides with a preset value corresponding to a desired sequence of pulses;

a second positive slope pulser electrically connected to the output of said number counter and decoder;

a fifth delay means electrically connected to the output of said second positive slope pulser which resets said number counter and decoder at a preset time delay interval;

a sequence counter electrically connected to the output of said second positive slope pulser;

a third decoder means electrically connected to said sequence counter which provides an output pulse only when the state of the counter coincides with a preset value corresponding to the end of a preset sequence wherein said sequence counter and third decoder transmits a signal to both said spacing counter and said number counter thereby automatically varying the preset pulse-rate-interval and pulse number;

a third positive slope pulser means electrically connected to said sequence counter and decoder;

a sixth delay means electrically connected to said fourth positive slope pulser for producing an output pulse which resets said sequence counter and decoder;

a differential voltage comparator electrically connected to said third gating means for providing an output to vary the dwell time of the computer of average transients according to preset values.

* * * * *